United States Patent [19]

Lee

[11] 3,803,364

[45] Apr. 9, 1974

[54] MARKER POWER FAILURE MAKE BUSY CIRCUIT

[75] Inventor: David Q. Lee, Chicago, Ill.

[73] Assignee: GTE Automatic Electric Labaratories Incorporated, Northlake, Ill.

[22] Filed: Nov. 2, 1972

[21] Appl. No.: 303,180

[52] U.S. Cl. .......................... 179/18 AB, 179/27 G

[51] Int. Cl. .......................................... H04m 3/12

[58] Field of Search ..................... 179/18 AB, 27 G

[56] References Cited

UNITED STATES PATENTS

| | | | |
|---|---|---|---|
| 3,506,789 | 4/1970 | Brockschmidt et al. | 179/27 G X |
| 3,585,318 | 6/1971 | Fuchs | 179/18 AB |

*Primary Examiner*—William C. Cooper

*Attorney, Agent, or Firm*—R. J. Black

[57] ABSTRACT

A power failure make busy arrangement in a marker for preventing or inhibiting an assigner from accessing a marker when it has suffered a power failure. The busy/idle lead from a marker to each assigner inhibits or allows the assigner to access the marker. With the arrangement of the invention, a marker power failure, marker out of service, and marker in call process condition are grouped and considered as a marker busy condition, thus inhibiting the assigner or other subsystems for accessing the marker. The marker therefore is placed in a non-accessible (busy) mode when the marker encounters any power failure condition. The assigner also automatically sense a busy state condition from the marker if the power to the marker's busy/idle circuit is removed.

5 Claims, 1 Drawing Figure

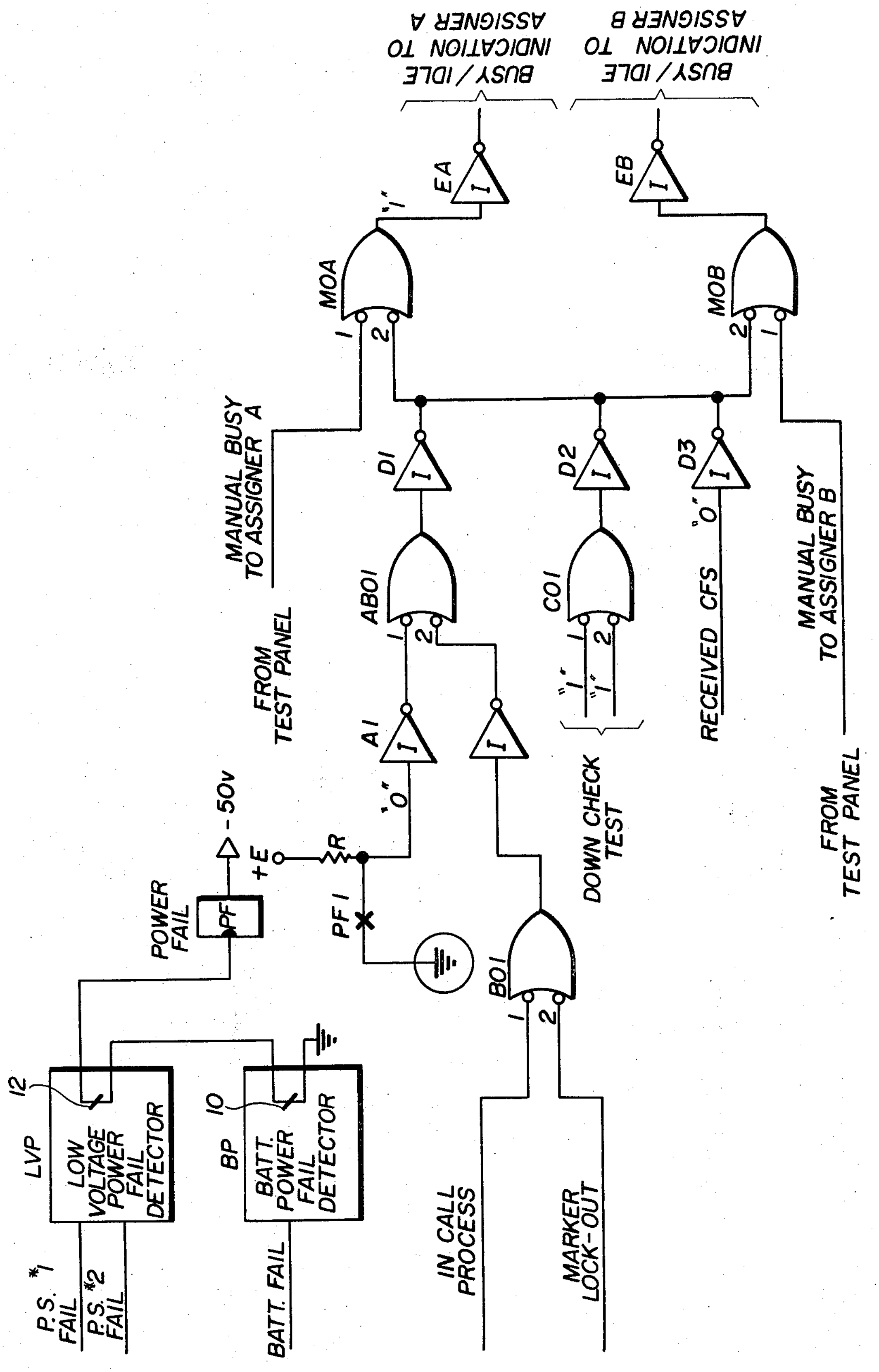
BUSY / IDLE INDICATION TO ASSIGNER A
BUSY / IDLE INDICATION TO ASSIGNER B
EA
EB
MOA
MOB
MANUAL BUSY TO ASSIGNER A
FROM TEST PANEL
MANUAL BUSY TO ASSIGNER B
FROM TEST PANEL
D1
D2
D3
AB01
C01
A1
B01
RECEIVED CFS
DOWN CHECK TEST
-50v
+E
R
PF1
POWER FAIL
PF
LVP
LOW VOLTAGE POWER FAIL DETECTOR
12
BP
BATT. POWER FAIL DETECTOR
10
P.S. *1 FAIL
P.S. *2 FAIL
BATT. FAIL
IN CALL PROCESS
MARKER LOCK-OUT

MARKER POWER FAILURE MAKE BUSY CIRCUIT

BACKGROUND OF THE INVENTION

This invention relates to an improved marker for a common control electronic communication system and, more particularly, to a power failure make busy arrangement in a marker to prevent it from being accessed when out of service due to a power failure.

In a common control electronic communication system, a marker selects, tests and connects an idle matrix path between the trunk of the incoming call to an outgoing trunk of the designated route. The physical location of the trunks are provided to the marker by a translator.

The translator, when it has received sufficient called data from a register-sender, decodes the data to the inlet trunk location, and locates idle outgoing trunks to the designated route. The translator then requests to an assigner for an idle marker. From the busy/idle leads of the markers, the assigner scans and ignores all leads with busy signals, then selects the first marker that indicates idle. This marker is enabled by the assigner, and is connected to the requesting translator.

If a marker power supply fails, the assigner has no means of detecting whether the enabled marker can perform its function. This problem can be alleviated by providing a separate power failure, or "Not for Service" lead, to each assigner, but this lead must sense all power failures, otherwise multi-leads would be required to each assigner.

Accordingly, it is an object of the present invention to provide an improved marker for a marker controlled electronic communication system.

More particularly, it is an object to provide an arrangement in a marker to inhibit an assigner from accessing it when the marker power supply fails.

More particularly still, it is an object to provide a power failure make busy arrangement in a marker for preventing or inhibiting an assigner from accessing a marker when it has suffered a power failure.

A still further object is to provide an arrangement in a marker whereby an assigner will automatically sense a busy state condition from the marker if the power to the marker's busy/idle circuit is removed.

Other objects of the invention will in part be obvious and will in part appear hereinafter.

SUMMARY OF THE INVENTION

The busy/idle lead from a marker to each assigner inhibits or allows the assigner to access the marker. A marker power failure, marker out of service, and marker in call process conditions then all can be grouped and considered as a marker busy condition, thus inhibiting the assigner or other subsystems from accessing the marker. The power failure make busy arrangement of the present invention functions to place the marker in a non-accessible (busy) mode when the marker encounters any power failure condition. The assigner also will automatically sense a busy state condition from the marker if the power to the marker's busy/idle circuit is removed.

BRIEF DESCRIPTION OF THE DRAWINGS

For a fuller understanding of the nature and objects of the invention, reference should be had to the following detailed description taken in connection with the accompanying drawings, in which:

FIG. 1 is a block diagram schematic of the power failure make busy arrangement of the invention.

DESCRIPTION OF THE PREFERRED EMBODIMENT

Referring now to the drawing, the power failure make busy arrangement within a marker can be seen to include a power failure relay PF. This relay normally is energized via a series circuit extending from ground through a normally closed contact 10 forming a battery power failure detector, a normally closed contact 12 forming a low voltage power failure detector, and the relay PF to a battery. If either the battery power or the low voltage power to the marker circuitry fails, the contact 10 or 12 opens, thereby opening the energizing circuit for the relay PF. The relay PF has a contact PF1 which, when the relay PF is energized, is closed and couples a logic ground through it to the input of an inverter A1, for reasons described more fully below.

The marker normally presents a logic 0 signal at the outputs of the inverters EA and EB to indicate a busy to the assigners A and B (not shown) coupled to these outputs, respectively. When the signal at these outputs of the inverters EA and EB are logic 1 signals, the marker is idle and the assigner A and B are permitted to enable the marker for service.

The marker indicates idle only when certain conditions are true, and correct logic signals are present at its gate inputs. To indicate idle, the inputs 1 and 2 of the NOR gate BO1 must see logic 1 signals to show that the marker is not in a call process or a lockout condition, the inputs 1 and 2 of the NOR gate CO1 must see logic 1 signals to show that the marker has not failed or is a DOWN CHECK test, the input of the inverter D3 must see a logic 0 signal to indicate that the marker has not received a call for service (CFS), and the input of the inverter A1 must see a logic 0 signal to indicate that battery and low voltage power are functioning properly. If any one of these conditions is not true, then the outputs of the inverters EA and EB will be a logic 0 signal to the assigners, indicating the marker is busy and not available for service.

It may be noted that the input of the inverter A1 will see a logic 0 signal only when the relay PF is energized, thus closing its contact PF1 to couple the logic ground to it. If power fails, ground is removed from the relay PF by the contact 10 forming the battery power failure detector or the contact 12 forming the low voltage power failure detector, and the relay PF is deenergized. Its contact PF1 opens and removes the logic ground from the input of the inverter A1, and the latter sees instead of logic 1 signal (the +E potential coupled to it through the resistor R). The output of the inverter A1 places a logic 0 signal on the input 1 of the NOR gate ABO1 and enables it to provide an output logic 1 signal to the input of the inverter D1. The output of the inverter D1 is a logic 0 signal to the busy/idle junction (the outputs from the inverters D1, D2 and D3) and hence the input 2 of the NOR gates MOA and MOB. These NOR gates MOA and MOB are enabled and provide logic 1 signals to the inputs of the inverters EA and EB, respectively. The inverters EA and EB thus provide logic 0 signal outputs indicating busy to the assigners A and B. The marker therefore places itself in a non-accessible (busy) mode when the marker encounters any power failure condition.

It may be further noted that the inputs to all of the logic gates BO1, ABO1 and CO1 of the busy/idle circuit must see a logic 1 signal, to indicate that the marker is idle. Accordingly, if power to the busy/idle circuit is removed or fails, the outputs of the inverters EA and EB will be caused to produce logic 0 signals, so that the assigners automatically sense a busy state condition.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a common control communication system including a marker for establishing a connection between a trunk of an incoming call to an outgoing trunk through a switching matrix, said marker including a busy/idle lead to each of a plurality of assigners for inhibiting or permitting an assigner to access the marker for service, a plurality of logic gates for coupling a first logic signal indicating an idle condition and a second logic signal indicating a busy condition to said busy/idle lead in accordance with the state of said marker, a logic signal coupled to one of said logic gates and causing said plurality of logic gates to couple said second logic signal to said busy/idle lead to indicate a busy condition to said assigners during the presence of a power failure condition, relay means for coupling another logic signal to said one logic gate to cause said plurality of logic gates to couple said first logic signal to said busy/idle lead to indicate an idle condition to said assigners during the absence of a power failure condition and an idle marker state, and power failure detector means for energizing said relay means in the absence of a power failure condition to couple said other logic signal to said one logic gate.

2. The communication system of claim 1, wherein said relay means includes a contact which is normally closed when said relay means is energized, said other logic signal being coupled through said contact to said one logic gate and operating said logic gate to cause said plurality of logic gates to couple said first logic signal to said busy/idle lead to indicate an idle condition to said assigners during the absence of a power failure condition and an idle marker state.

3. The communication system of claim 2, further including an energizing circuit for said relay means, said power failure detector means being included in series circuit relation in said energizing circuit and being operable to open said energizing circuit in the presence of a power failure condition to thereby de-energize said relay means, said relay means upon being de-energized opening said contact to remove said other logic signal from said one logic gate.

4. The communication system of claim 3, wherein said power failure detector means comprises a low voltage power failure detector and a battery power failure detector, each of which is included in said energizing circuit in series circuit relation with said relay means and is operable to open said energizing circuit to de-energize said relay means in the event of a low voltage power failure condition and a battery power failure condition, respectively.

5. The communication system of claim 1, wherein the inputs to each of said plurality of logic gates during an idle condition is such that the removal or failure of the power to any one of said plurality of logic gates causes said logic signal to be coupled to said busy/idle lead, whereby said assigners automatically sense a marker busy condition.

* * * * *